US008575841B2

(12) United States Patent
Cartwright

(10) Patent No.: US 8,575,841 B2
(45) Date of Patent: Nov. 5, 2013

(54) MRI-ROOM LED LIGHTING SYSTEM

(75) Inventor: Brandon S. Cartwright, Lake Villa, IL (US)

(73) Assignee: Kenall Manufacturing, Gurnee, IL (US)

( * ) Notice: Subject to any disclaimer, the term of this patent is extended or adjusted under 35 U.S.C. 154(b) by 202 days.

(21) Appl. No.: 13/106,457

(22) Filed: May 12, 2011

(65) Prior Publication Data

US 2011/0279032 A1 Nov. 17, 2011

Related U.S. Application Data

(60) Provisional application No. 61/334,000, filed on May 12, 2010.

(51) Int. Cl.
*H01J 5/02* (2006.01)

(52) U.S. Cl.
USPC .......................................................... 315/85

(58) Field of Classification Search
None
See application file for complete search history.

(56) References Cited

U.S. PATENT DOCUMENTS

| | | | |
|---|---|---|---|
| 7,178,941 B2 | 2/2007 | Roberge et al. | |
| 7,343,191 B1* | 3/2008 | Damadian et al. | 600/410 |
| 7,629,570 B2* | 12/2009 | Mondloch et al. | 250/227.11 |
| 7,982,410 B2* | 7/2011 | Adenau | 315/295 |
| 2007/0108843 A1* | 5/2007 | Preston et al. | 307/112 |
| 2009/0096392 A1* | 4/2009 | Chandran et al. | 315/312 |

* cited by examiner

*Primary Examiner* — Crystal L Hammond
(74) *Attorney, Agent, or Firm* — Jansson Munger McKinley & Shape Ltd.

(57) ABSTRACT

In an MRI-room LED lighting system having a plurality of LED lighting fixtures and a power supply located outside of the MRI room, the improvement comprising: driver circuitry and PWM dimmer circuitry in each of the lighting fixtures and a dimmer control located outside of the MRI room for controlling the light output of the lighting fixtures, the dimmer control having a variable DC output to control the PWM dimmer circuitry in each lighting fixture, whereby conductor lines from the power supply and dimmer control do not require electrical shielding avoid interference between a MRI scanner and the lighting system.

6 Claims, 17 Drawing Sheets

LED Cleanscene™ and downlight

Cleanscene™ dimmer PWM circuit 0-10V dimmer control linear driver with PWM dimmer circuit LED downlights in an MRI room LED downlight (back view)

LED ring for an LED downlight

LED undercabinet lighting fixture

LED sconce lighting fixtures

320W Single Output with PFC Function

SP-320 series

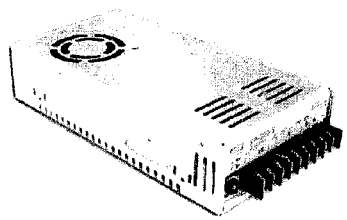

■ Features :
* Universal AC input / Full range
* Built-in active PFC function, PF>0.95
* Protections:Short circuit/Over load/Over voltage/Over temperature
* Forced air cooling by built-in DC Fan
* Built-in fan speed control
* Fixed switching frequency at 100KHz

SPECIFICATION

| MODEL | | | SP-320-3.3 | SP-320-5 | SP-320-7.5 | SP-320-12 | SP-320-13.5 | SP-320-15 | SP-320-24 | SP-320-27 | SP-320-36 | SP-320-48 |
|---|---|---|---|---|---|---|---|---|---|---|---|---|
| OUTPUT | DC VOLTAGE | | 3.3V | 5V | 7.5V | 12V | 13.5V | 15V | 24V | 27V | 36V | 48V |
| | RATED CURRENT | | 55A | 55A | 40A | 25A | 22A | 20A | 13A | 11.7A | 8.8A | 6.7A |
| | CURRENT RANGE | | 0~60A | 0~55A | 0~55A | 0~40A | 0~25A | 0~22A | 0~20A | 0~13A | 0~11.7A | 0~8.8A | 0~6.7A |
| | RATED POWER | | 181.5W | 275W | 300W | 300W | 297W | 300W | 312W | 315.9W | 316.8W | 321.6W |
| | RIPPLE & NOISE (max.) Note.2 | | 150mVp-p | 150mVp-p | 150mVp-p | 150mVp-p | 150mVp-p | 150mVp-p | 150mVp-p | 150mVp-p | 220mVp-p | 240mVp-p |
| | VOLTAGE ADJ. RANGE | | 3.14~3.63V | 4.5~5.5V | 6~9V | 10~13.2V | 12~15V | 13.5~18V | 20~26.4V | 26~31.5V | 32.4~39.6V | 41~56V |
| | VOLTAGE TOLERANCE Note.3 | | ±1.0% | ±2.0% | ±2.0% | ±1.0% | ±1.0% | ±1.0% | ±1.0% | ±1.0% | ±1.0% | ±1.0% |
| | LINE REGULATION | | ±0.5% | ±0.5% | ±0.5% | ±0.3% | ±0.3% | ±0.3% | ±0.2% | ±0.2% | ±0.2% | ±0.2% |
| | LOAD REGULATION | | ±1.5% | ±1.0% | ±1.0% | ±0.5% | ±0.5% | ±0.5% | ±0.5% | ±0.5% | ±0.5% | ±0.5% |
| | SETUP, RISE TIME | | 800ms, 50ms/230VAC  2500ms, 50ms/115VAC at full load | | | | | | | | | |
| | HOLD TIME (Typ.) | | 16ms/230VAC   16ms/115VAC at full load | | | | | | | | | |
| INPUT | VOLTAGE RANGE Note.5 | | 88~264VAC   124~370VDC | | | | | | | | | |
| | FREQUENCY RANGE | | 47~63Hz | | | | | | | | | |
| | POWER FACTOR (Typ.) | | PF>0.95/230VAC    PF>0.98/115VAC at full load | | | | | | | | | |
| | EFFICIENCY (Typ.) | | 74% | 79% | 83% | 86% | 86% | 86% | 87% | 88% | 87% | 89% |
| | AC CURRENT (Typ.) | 115VAC | 2.5A | 5A | | | | | | | | |
| | | 230VAC | 1.5A | 2.5A | | | | | | | | |
| | INRUSH CURRENT (Typ.) | | 20A/115VAC    40A/230VAC | | | | | | | | | |
| | LEAKAGE CURRENT | | <1mA / 240VAC | | | | | | | | | |
| PROTECTION | OVER LOAD | | 105~135% rated output power | | | | | | | | | |
| | | | Protection type : Hiccup mode, recovers automatically after fault condition is removed | | | | | | | | | |
| | OVER VOLTAGE | | 3.8~4.5V | 5.75~6.75V | 9.4~10.9V | 13.8~16.2V | 15.5~18.2V | 18~21V | 27.6~32.4V | 33.7~39.2V | 45~52.5V | 57.6~67.2V |
| | | | Protection type : Shut down o/p voltage, re-power on to recover | | | | | | | | | |
| | OVER TEMPERATURE | | 80°C ±5°C (70°C ±5°C  3.3V,5V only) (TSW1 : Detect on heatsink of power transistor) | | | | | | | | | |
| | | | Protection type : Shut down o/p voltage, recovers automatically after temperature goes down | | | | | | | | | |
| ENVIRONMENT | WORKING TEMP. | | -20~+65°C (Refer to output load derating curve) | | | | | | | | | |
| | WORKING HUMIDITY | | 20~90% RH non-condensing | | | | | | | | | |
| | STORAGE TEMP., HUMIDITY | | -40~+85°C, 10~95% RH | | | | | | | | | |
| | TEMP. COEFFICIENT | | ±0.03%/°C (0~50°C) | | | | | | | | | |
| | VIBRATION | | 10~500Hz, 2G 10min./1cycle, 60min. each along X, Y, Z axes | | | | | | | | | |
| SAFETY & EMC (Note 4) | SAFETY STANDARDS | | UL60950-1, TUV EN60950-1 Approved | | | | | | | | | |
| | WITHSTAND VOLTAGE | | I/P-O/P:3KVAC  I/P-FG:1.5KVAC  O/P-FG:0.5KVAC | | | | | | | | | |
| | ISOLATION RESISTANCE | | I/P-O/P, I/P-FG, O/P-FG:100M Ohms/500VDC | | | | | | | | | |
| | EMI CONDUCTION & RADIATION | | Compliance to EN55022 (CISPR22) Class B | | | | | | | | | |
| | HARMONIC CURRENT | | Compliance to EN61000-3-2,-3 | | | | | | | | | |
| | EMS IMMUNITY | | Compliance to EN61000-4-2,3,4,5,6,8,11; ENV50204, EN55024, Light Industry level, criteria A | | | | | | | | | |
| OTHERS | MTBF | | 207K hrs min.  MIL-HDBK-217F (25°C) | | | | | | | | | |
| | DIMENSION | | 215*115*50mm (L*W*H) | | | | | | | | | |
| | PACKING | | 1.1Kg; 12pcs/14Kg/0.92CUFT | | | | | | | | | |
| NOTE | 1. All parameters NOT specially mentioned are measured at 230VAC input, rated load and 25°C of ambient temperature.<br>2. Ripple & noise are measured at 20MHz of bandwidth by using a 12" twisted pair-wire terminated with a 0.1uf & 47uf parallel capacitor.<br>3. Tolerance : includes set up tolerance, line regulation and load regulation.<br>4. The power supply is considered a component which will be installed into a final equipment. The final equipment must be re-confirmed that it still meets EMC directives.<br>5. Derating may be needed under low input voltages. Please check the derating curve for more details. | | | | | | | | | | | |

FIG. 16A

MRI-ROOM LED LIGHTING SYSTEM

RELATED APPLICATION

This application claims the benefit of U.S. Provisional Application No. 61/334,000 filed on May 12, 2010, the contents of which is incorporated by reference herein in its entirety.

FIELD OF THE INVENTION

This invention is related generally to lighting technology. More particularly, the invention relates to the field of LED lighting fixtures and systems for use in environments in which there exist high magnetic fields and/or radio frequency interference which can interfere with or be interfered by electrical systems within the environment such as an MRI (magnetic resonance imaging) room.

BACKGROUND OF THE INVENTION

In environments such as magnetic resonance imaging (MRI) rooms in medical facilities, there can exist high magnetic fields which can interfere with other electrical systems such as the lighting in the room (e.g., light flicker). It is also the case that equipment such as that found in lighting systems may cause unwanted artifacts (from the radio frequency interference (RFI) emitted by the lighting systems) in the data (corrupted data) being gathered by the MRI system itself. Both of these effects are problematic in such a facility.

The magnetic fields in such facilities may be quite high. For example, in an MRI room having a 3-Tesla MRI system, magnetic field strengths may be as high as 300V/meter or more and magnetic field gradients as high as 820 gauss/cm or more are possible. The frequencies of interest in the signals being measured are in the megahertz range. For a 3-Tesla system, the upper range of such frequencies are up to on the order of 128 MHZ.

LED lighting systems are becoming important for many lighting application because, among other advantages, such systems consume much less power than several other types of lighting systems. There are other advantages as well, such as the fact that incandescent lamps may have extremely short operating lives in such high-magnetic field environments. Thus, for these and other reasons, it is desirable to be able to install LED-based lighting in environments such as MRI rooms and that such systems not be affected by the high fields or disturb the data-taking process in any way. Often the use of dimmer circuitry can be an important source of such interference.

OBJECTS OF THE INVENTION

It is an object of the present invention to provide an LED dimmable lighting system which provides lighting to an MRI room without interfering with the quality of the data being gathered by the MRI equipment, including the MRI scanner.

An object of the present invention is to provide an LED dimmable lighting system which provides lighting to an MRI room without having the quality of the lighting reduced by the presence of the high magnetic fields in the MRI room.

Yet another object the present invention is to provide an LED dimmable lighting system which provides lighting to an MRI room utilizing several different types of LED lighting fixtures. A further object is the present invention is to control the light output of all of the LED fixtures in the MRI room with a single dimmer control.

These and other objects of the invention will be apparent from the following descriptions and from the drawings.

SUMMARY OF THE INVENTION

The term "luminaire" is used interchangeably with the terms "lighting fixture" and "fixture" in this document. The term "linear driver" as used herein means that the driver circuit is not operating in switched mode.

An MRI-room LED lighting system having a plurality of LED lighting fixtures and a power supply located outside of the MRI room is provided. The MRI-room LED lighting system includes driver circuitry and PWM dimmer circuitry in each of the lighting fixtures and a dimmer control located outside of the MRI room for controlling the light output of the lighting fixtures. The dimmer control includes variable DC output to control the PWM dimmer circuitry in each lighting fixture such that conductor lines from the power supply and dimmer control do not require electrical shielding to avoid interference between a MRI scanner and the lighting system.

The conductor lines from the power supply of the MRI-room LED lighting system may be electrically shielded to further reduce frequency interference, including radio frequency interference, on the lines. The conductor lines from the dimmer control of the MRI-room LED lighting system maybe electrically shielded to further reduce frequency interference on the lines.

The MRI-room LED lighting system may include LED lighting fixtures each having substantially the same driver and PWM dimmer circuitry such that the electrical-to-light characteristics of each lighting fixture are substantially the same. The MRI-room LED lighting system may include the driver circuitry and PWM dimmer circuitry in each lighting fixture located on a single printed circuit board.

BRIEF DESCRIPTION OF THE DRAWINGS

In order that the advantages of the invention will be readily understood, a more detailed description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 16A and 16B are specification sheets on a MeanWell SP-320 series DC power supply such as may be used in an MRI-room LED lighting system.

DETAILED DESCRIPTION OF PREFERRED EMBODIMENTS

Many of the functional units described in this specification have been labeled as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, other discrete components or any combination of such elements. A module may also be implemented in programmable hardware devices such as field programmable gate arrays, programmable array logic, programmable logic devices or the like.

One skilled in the art will recognize, however, that the invention may be practiced without one or more of the specific details, or with other methods, components, materials, and the like. In other instances, well-known structures, materials, or operations are not shown or described in detail to avoid obscuring aspects of the invention.

Various circuitry, circuit components and modules of the present invention may be performed by a computer program. The computer program can exist in a variety of forms both active and inactive. For example, the computer program can exist as software possessing program instructions or statements in source code, object code, executable code or other formats; firmware program(s); or hardware description language (HDL) files. Any of the above can be embodied on a computer readable medium, which include storage devices and signals, in compressed or uncompressed form. Such computer readable storage devices include conventional computer RAM (random access memory), ROM (read only memory), EPROM (erasable, programmable ROM), EEPROM (electrically erasable, programmable ROM), and the like. It will be understood by those skilled in the art that a computer system hosting or running the computer program can be configured to access a variety of signals, including but not limited to signals downloaded through the Internet or other networks.

Figure 1:
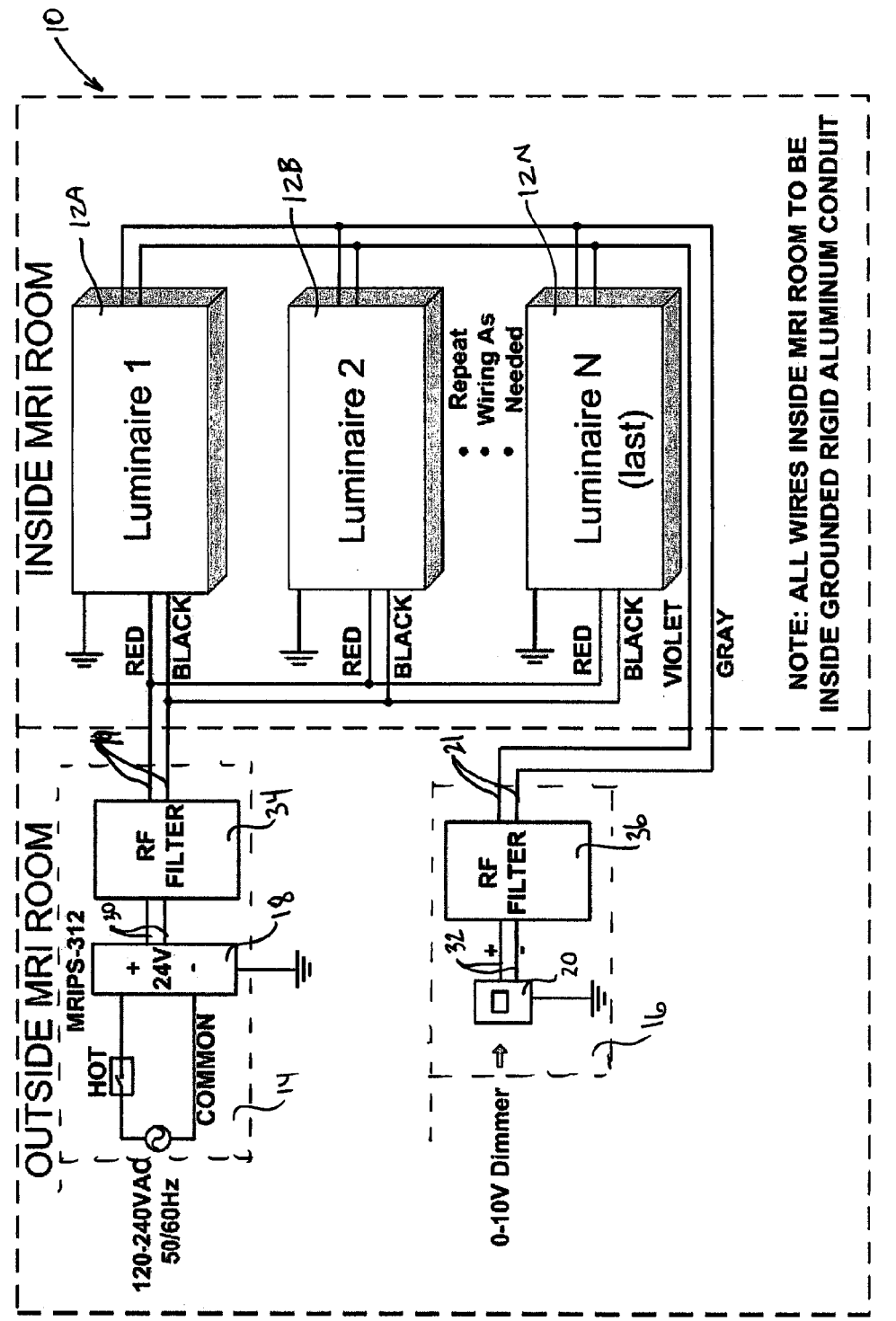
FIG. 1 is a schematic block diagram of an embodiment of the inventive LED lighting system for MRI rooms.

FIG. 1 shows a high-level schematic block diagram 10 of one embodiment of the LED lighting system of the present invention. The diagram illustrates that the luminaires 12A, 12B, 12N are located in the room in which MRI equipment, including a MRI scanner, resides (the MRI room) while the power supply module 14 and dimmer control module 16 are located in a separate room outside of the MRI room. Note that FIG. 1 indicates that in such an embodiment, the wires (conductor lines) within the MRI room are all shielded. In another embodiment, certain of such wires (the power supply lines and dimmer control lines) are not shielded.

Figure 6:
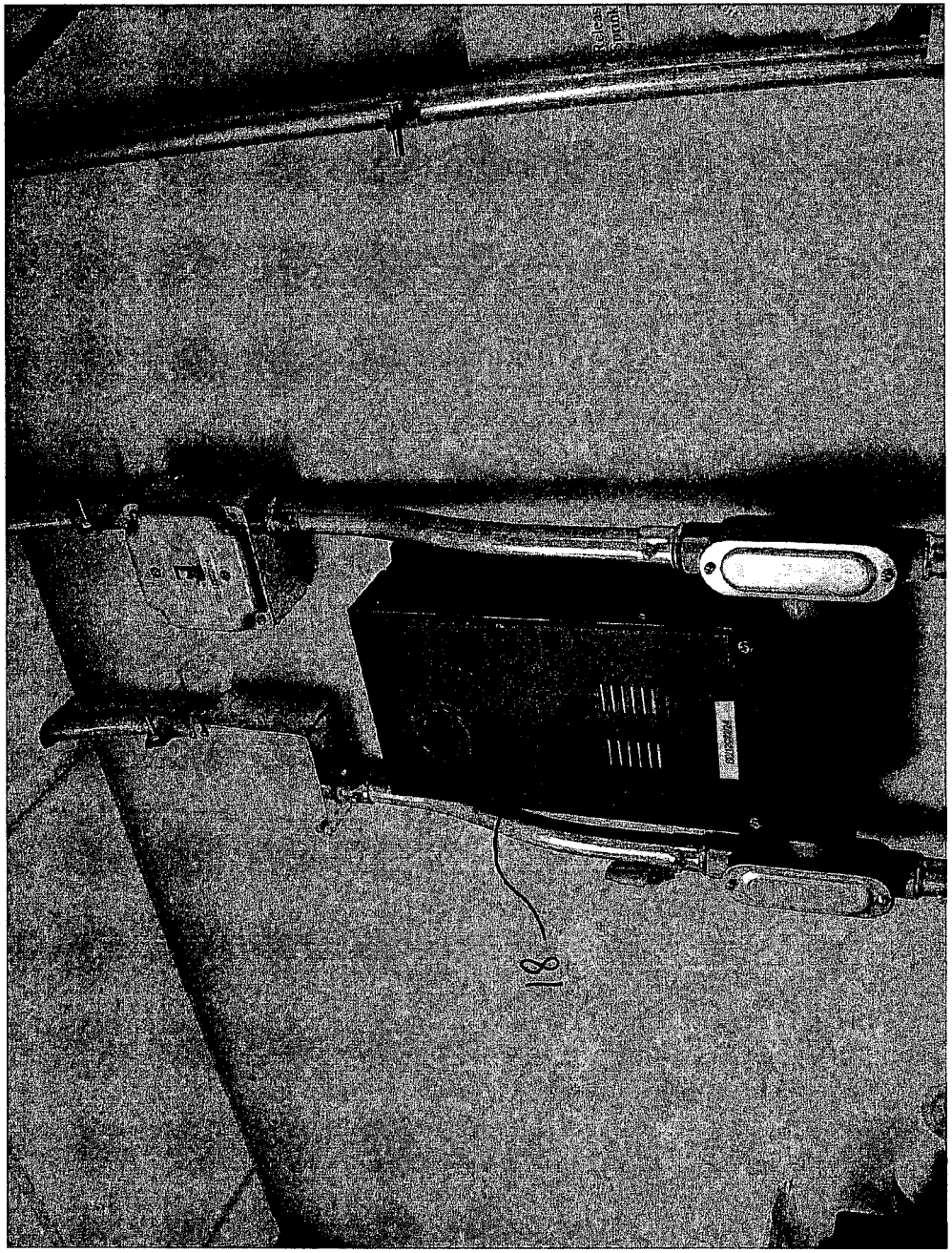
FIG. 6 is a photograph of a remote DC power supply of an embodiment of the inventive LED MRI-room lighting system.
Figure 16B:
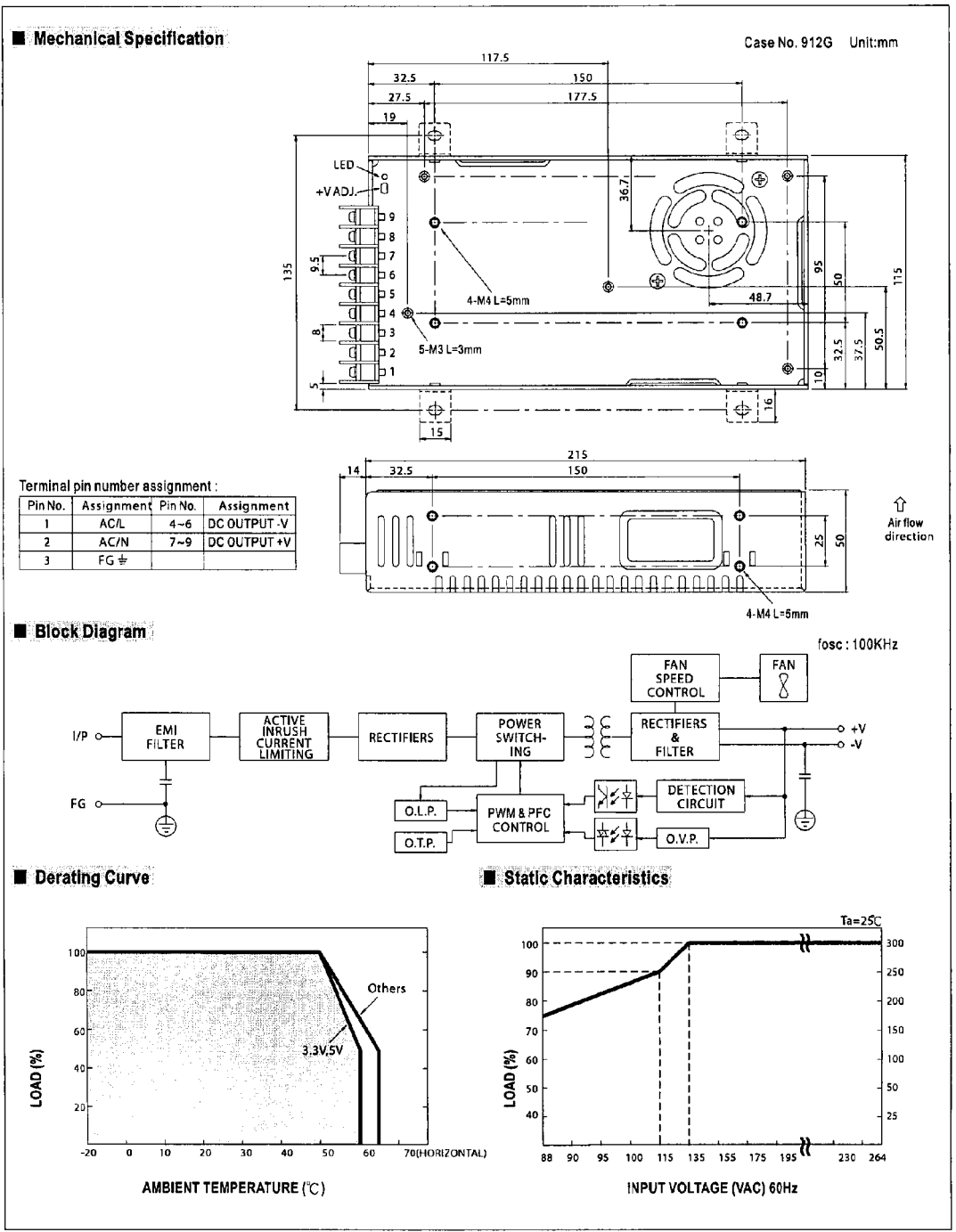

In the separate (outside) room, an AC-to-DC power supply 18 such as one providing 24 V DC, provides electrical power to the lighting system in the MRI room (FIG. 6). In a preferred embodiment, one such power supply may be a MeanWell SP-320 series power supply, the specifications of which are shown in FIGS. 16A and 16B.

Also located in this separate space is a dimmer control 20 which is a DC device (not operating in switched mode) such that the dimmer control signal is a DC voltage level. In a preferred embodiment, dimmer control 20 may be a unit such as a Leviton IllumaTech™ IP710 regulated analog current sink dimmer control.

Figure 4:
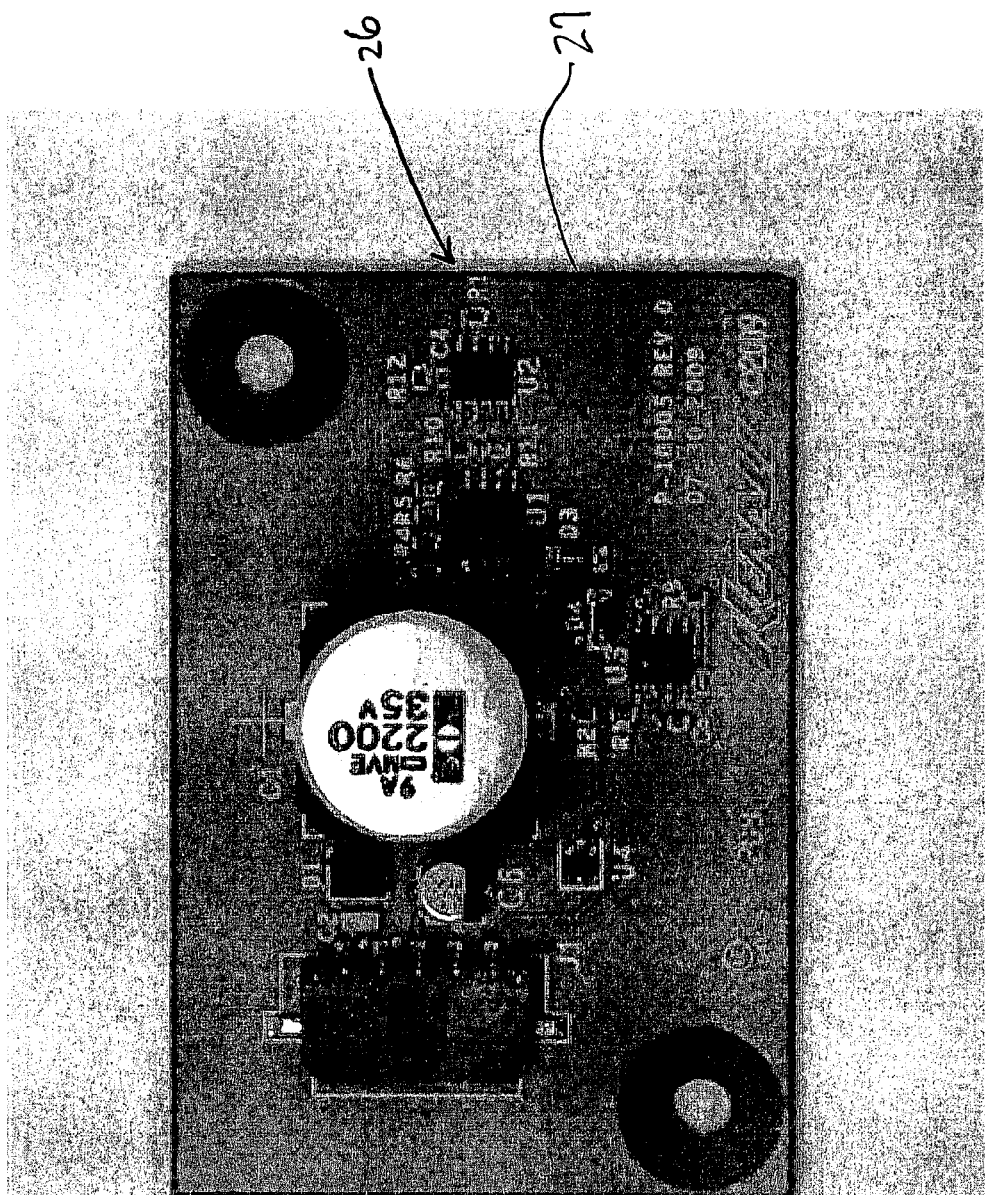
FIG. 4 is a photograph of a dimmer circuit using pulse-width modulation as applied to an embodiment of the inventive LED MRI-room lighting system.
Figure 7:
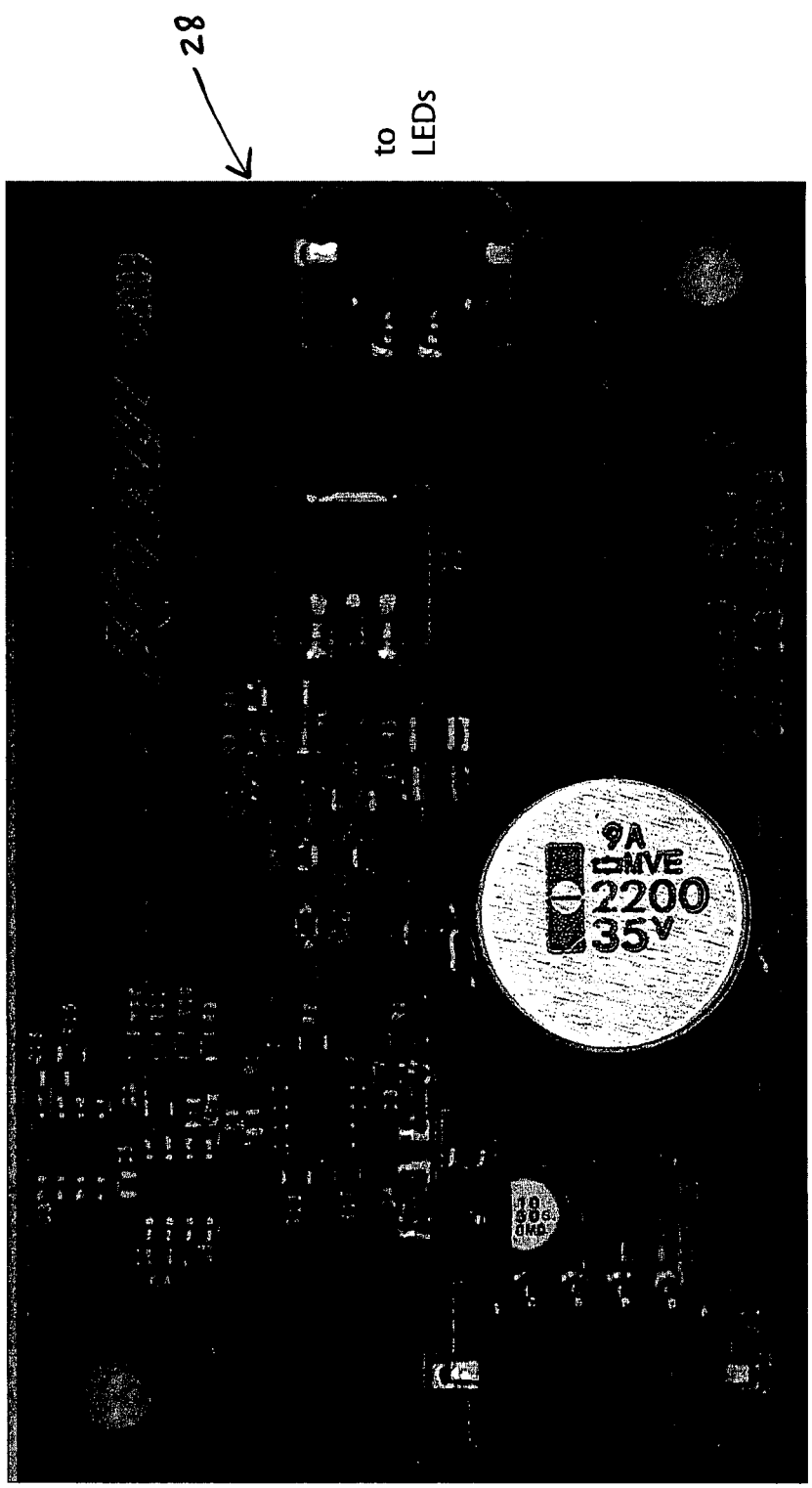
FIG. 7 is a photograph of a circuit board of a linear driver circuit with pulse-width modulation (PWM) dimming controlled by a DC voltage level. Such a circuit board may be used in the downlight, sconce or undercabinet LED lighting fixtures shown herein for inclusion in an MRI-room LED lighting system.
Figure 9:
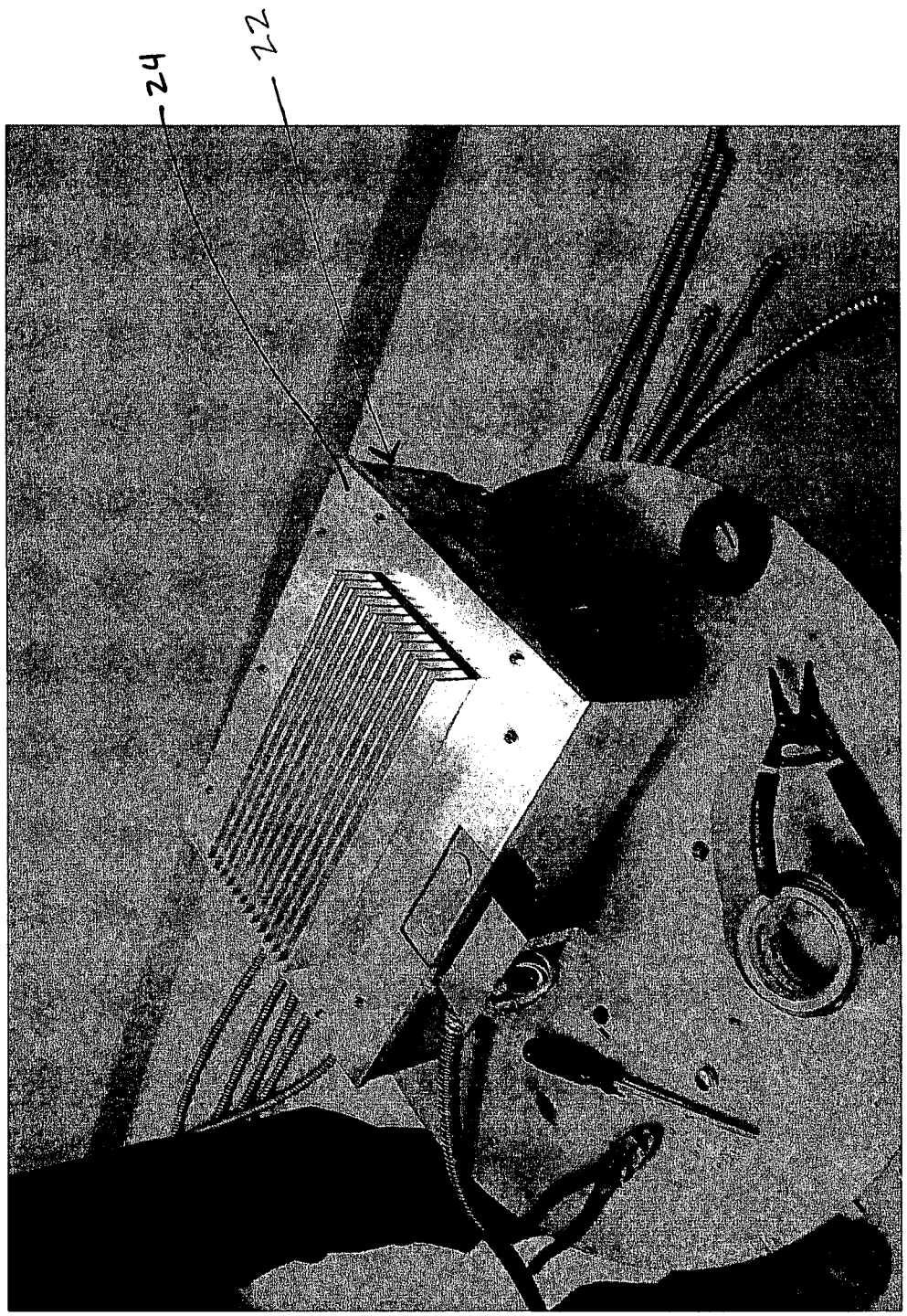
FIG. 9 is a photograph of a recessed LED downlight luminaire as used in the inventive MRI-room LED lighting system.

As shown in FIG. 4, a pulse-width modulation (PWM) dimming circuit 26 may be located within each LED lighting fixture such that the RFI emanating from such circuit is contained within the metallic shielding 22 of the lighting fixture housing 24 as shown in FIG. 9. Each PWM dimmer circuit 26 on printed circuit board 27 illustrated in FIG. 4 (one in each LED lighting fixture) receives the DC voltage from dimmer control 20 and produces a PWM signal at a frequency such as about 250 Hz, modifying the width of the ON portion of the PWM signal to produce a desired control signal for the linear driver circuit 28 shown in FIGS. 7 and 15.

As shown in FIG. 1, each LED fixture 12A, 12B, 12N may have one or more linear driver circuits with PWM dimmer circuits 28 to receive the PWM dimmer signal on lines 21 and power from the power supply on lines 19 thereby driving the LEDs at the desired light output level.

The DC power supply output 30 and the output of the dimmer control 32 are filtered using RF filters 34, 36 before the power and control signal enter the MRI room via conductor lines 19 and 21, respectively (FIG. 1). This filtering assures that any RFI or EMI introduced into conductor lines 19, 21 is substantially reduced before entering the MRI-room environment. RF filters such as an ETS Lindgren Model EQ-2001-NR may be used for the dimmer control signal and an ETS Lindgren Model ELUL-2030 may be used for the 24V power supply output lines.

The LED lighting fixtures 12A, 12B, 12N which may be used in embodiments of the inventive LED MRI-room lighting system may use linear driver circuits and PWM dimmer circuits which are substantially the same in that they have very similar electrical performance characteristics. Such similar characteristics allow the light output from the plurality of fixtures to behave in similar fashion when controlled by a common dimer control signal through conductor lines 21.

Figure 10:
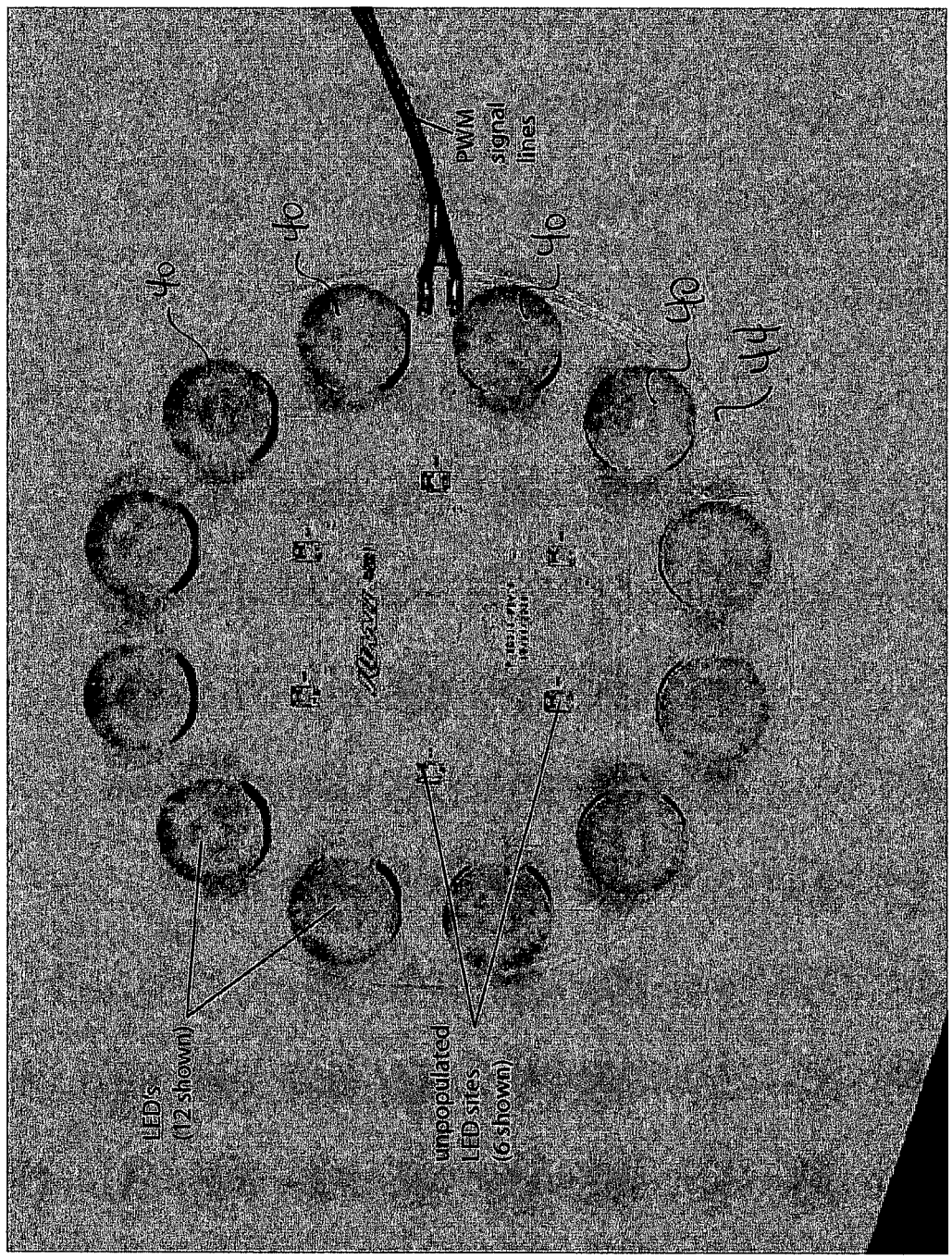
FIG. 10 is a photograph of a ring-configured circuit board containing LED's for a recessed LED downlight luminaire as used in an embodiment the inventive MRI-room LED lighting system.

Printed circuit boards utilized in such lighting fixtures may contain either one of the linear driver circuit 38 (see FIG. 3) or PWM control circuit 26 (see FIG. 4) or a combination of both linear driver and PWM control circuits 28 (see FIG. 7), depending on the configuration of the LED lighting fixture. The printed circuit boards may include the LEDs 40 mounted on the board 42 (see FIG. 3) or the LEDs 40 may be mounted on a separate printed circuit board 44 (see FIG. 10). The printed circuit boards may include a separate metallic layer to provide RF shielding around the circuit elements.

Figure 3:
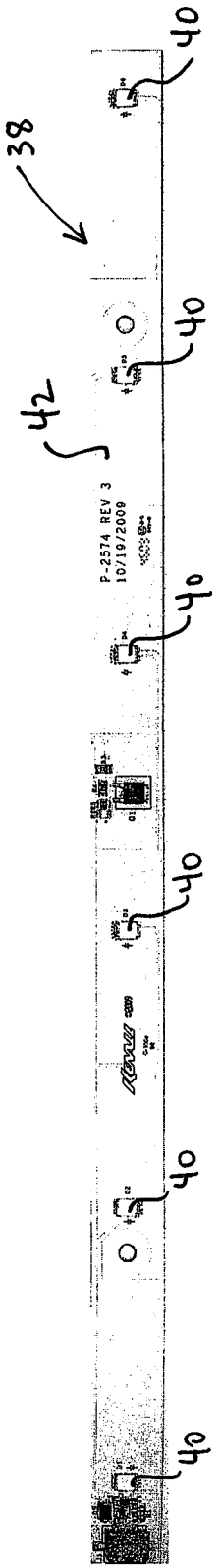
FIG. 3 is a photograph of a circuit board containing LED's and driver circuitry for a graphic image LED lightbox luminaire.
Figure 13:
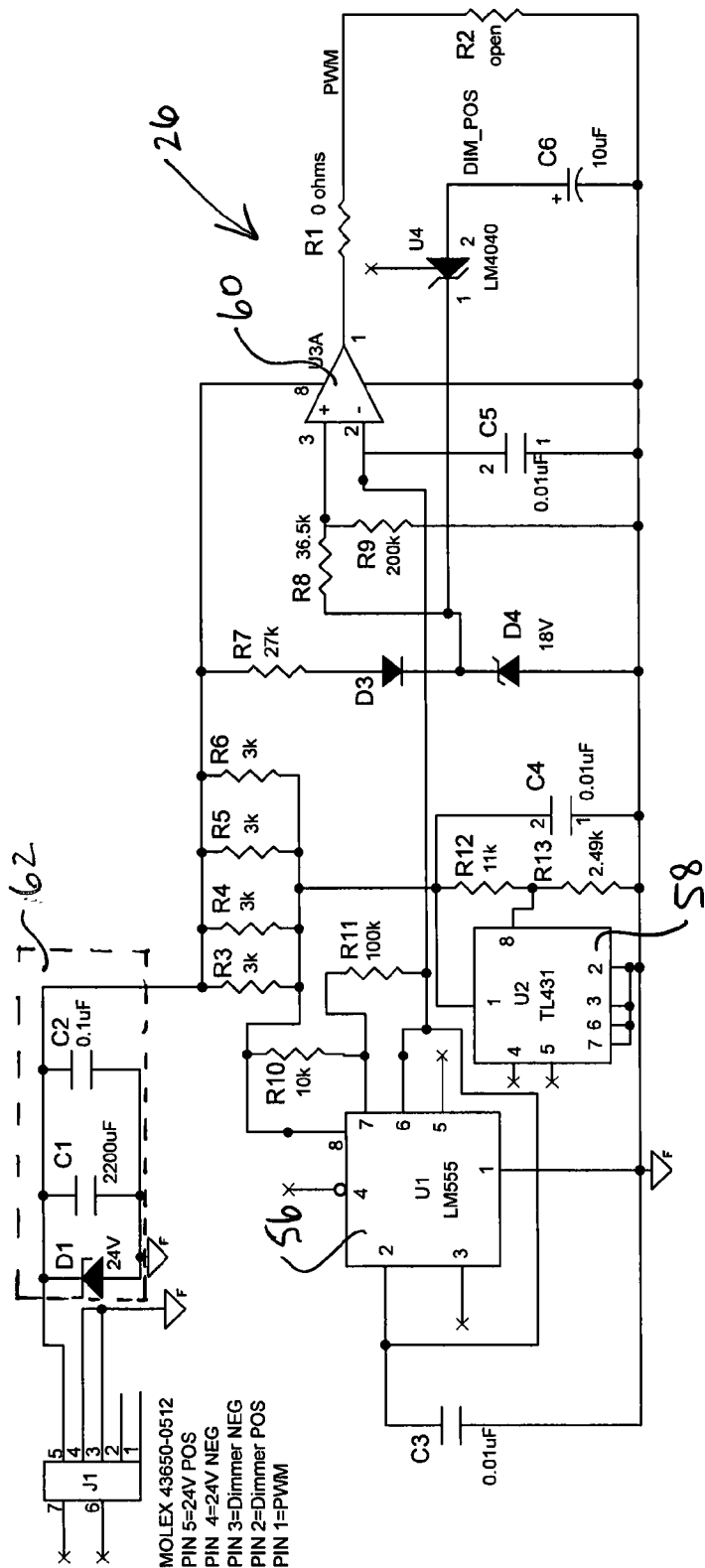
FIG. 13 is a circuit schematic of a PWM dimmer. Such a separate PWM dimmer circuit may be used in a Cleanscene™ lighting fixture having an LED driver circuit on a separate circuit board with the LED's.
Figure 14:
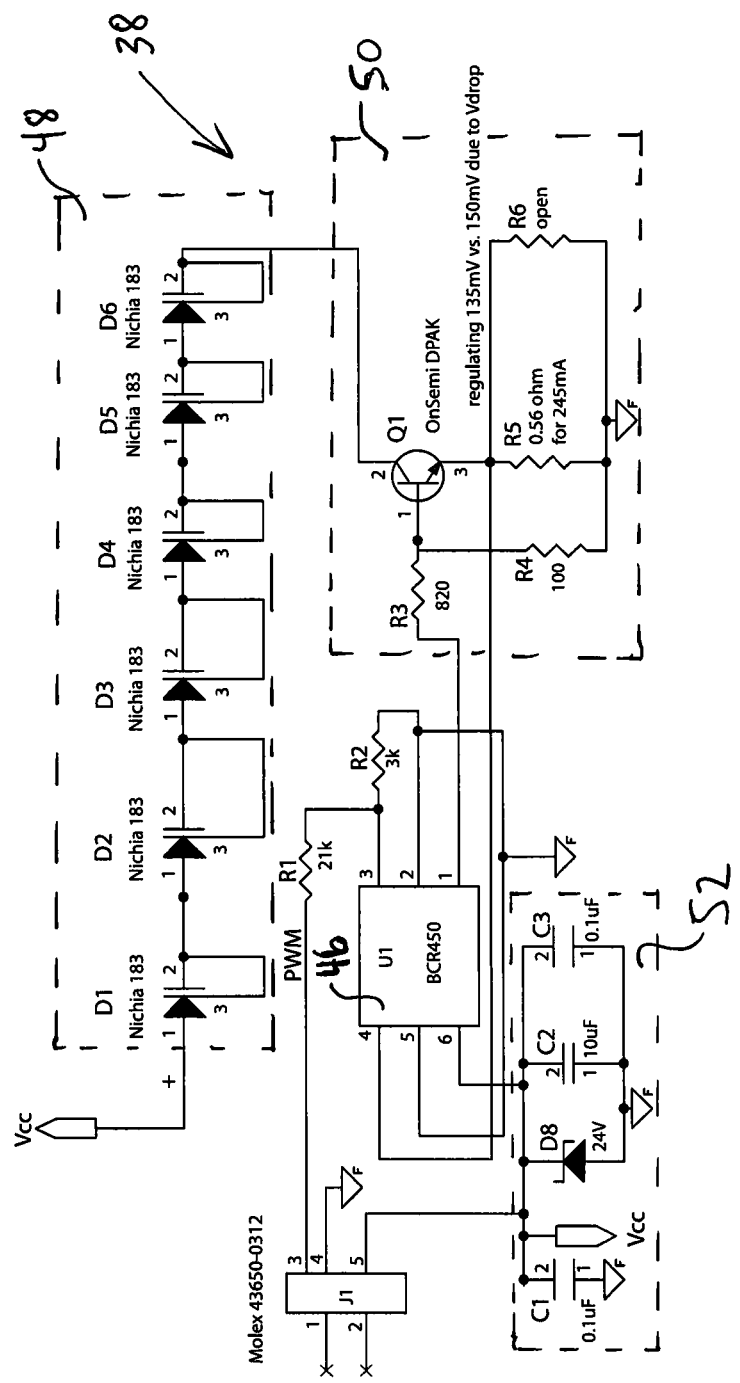
FIG. 14 is a circuit schematic of an LED linear driver circuit and LED's to be driven. Such a circuit may be used in a Cleanscene™ lighting fixture having a PWM circuit on a separate circuit board.
Figure 15:
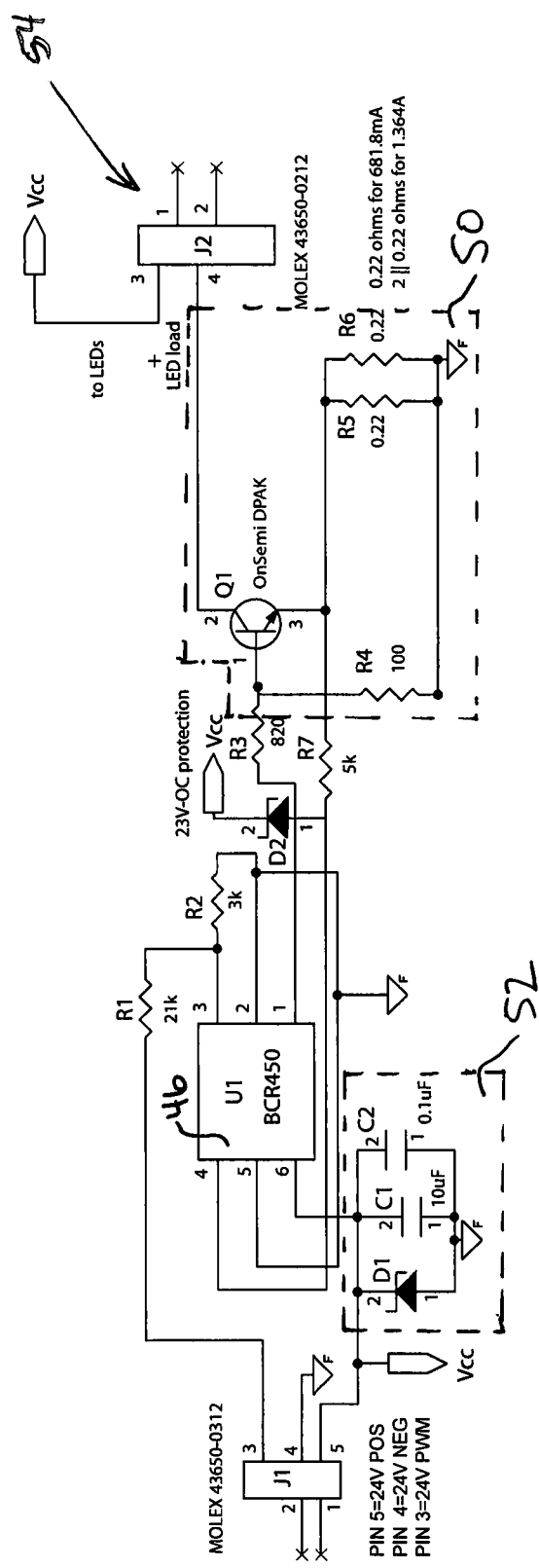
FIG. 15 is a circuit schematic of an LED linear driver circuit (without the LED's) such as is used to drive LED's in an MRI-room LED lighting system fixture.

FIGS. 13-15 show circuit schematic diagrams of linear driver circuits and PWM dimmer control circuits. FIG. 14 shows a preferred embodiment of the linear driver circuit 38 (see FIG. 3) used with an LED array on the same printed circuit board typically associated with the lighting fixture as described above. As can be seen, power LED driver module 46 drives LED array 48 through voltage regulation circuit 50. Power is filtered through filter circuit 52. The actual printed circuit board 42 including the linear driver circuit 38 depicted in FIG. 14 is shown in FIG. 3. Linear driver circuit 38 on printed circuit board 42 are typically on the lighting fixture inside the MRI room.

FIG. 15 shows a preferred embodiment of a linear driver circuit 54 (similar to the circuit depicted in FIG. 14) used with an external LED array. An external LED array is associated with each lighting fixture 12A, 12B, 12N (FIG. 1) on a printed circuit board located inside the MRI room on the lighting fixture as described above. As can be seen, power LED driver module 46 drives an LED array on fixture through voltage regulation circuit 50. Power is filtered through filter circuit 52. Linear driver circuit 54 is on a printed circuit board which is typically outside the MRI room.

FIG. 13 shows a preferred embodiment of the dimmer pulse width modulation (PWM) circuit 26 (see FIG. 4) typically located inside the MRI room as described above. Oscillator 56 in combination with controller 58 provide the signal which is driven by driver 60. Filter module 62 provide the radio frequency filtering of the power supplied to the lighting fixtures 12A, 12B, 12N. The actual printed circuit board 27 including the dimmer pulse width modulation (PWM) circuit 26 depicted in FIG. 13 is shown in FIG. 4.

Figure 2:
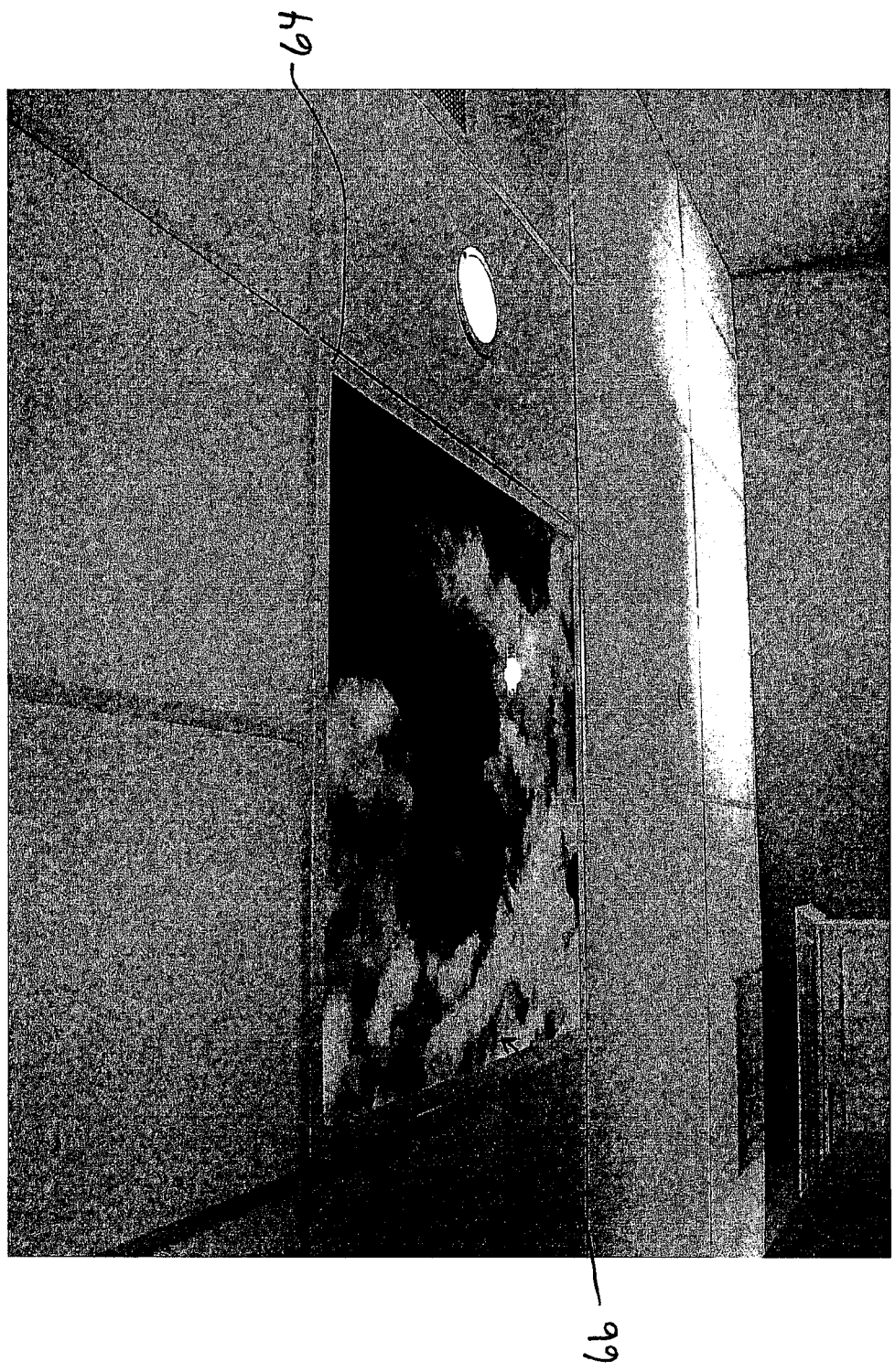
FIG. 2 is a photograph of a 4-foot by 4-foot ceiling mount, recessed grid graphic image LED lightbox luminaire and a 6-inch aperture recessed LED downlight luminaire, both as used in an embodiment of the inventive LED lighting system of FIG. 1 and installed in a grid ceiling system.

As shown in FIGS. 2 and 9, housing 24 and door frame 64 of the luminaires may be constructed from 18-gauge aluminum which is preferably polyester powder coated. A graphic image 66 may be placed within the door frame such that the light emanating from the luminaire provides illumination of the image. Housing 24 is preferably hole-free and is of seam welded construction with an internal hinge design. The construction of the luminaire provides for a quick, one-person installation and removal of door frame 64 for servicing of electrical components and graphic image 66. Fasteners (not shown) maybe used to secure the luminaire in place and may also be use to secure door 64 to housing 24.

The luminaire includes a lens member which may be typically sealed to frame or door frame 64 using a high-strength acrylic adhesive. A frame or door frame gasket (not shown) may also be used to further seal frame or door frame 64 to housing 24. One or more luminaires may be configured in various arrangements including squares, rectangles and cross patterns of various sizes.

The luminaire may preferably operate at high-brightness in the range of from approximately 3000K to approximately 6500K LED light source. The luminaire includes an input at 24V DC from a 120-240V AC, high power factor power supply which is typically remotely mounted from the luminaire. One such power supply is model MRIPS-312 MedMaster™ External Power Supply available from Kenall Manufacturing Company. The specifications of the MRIPS-312 MedMaster™ External Power Supply, including graphs of lighting performance, are shown in FIGS. 16A and 16B.

Figure 5:
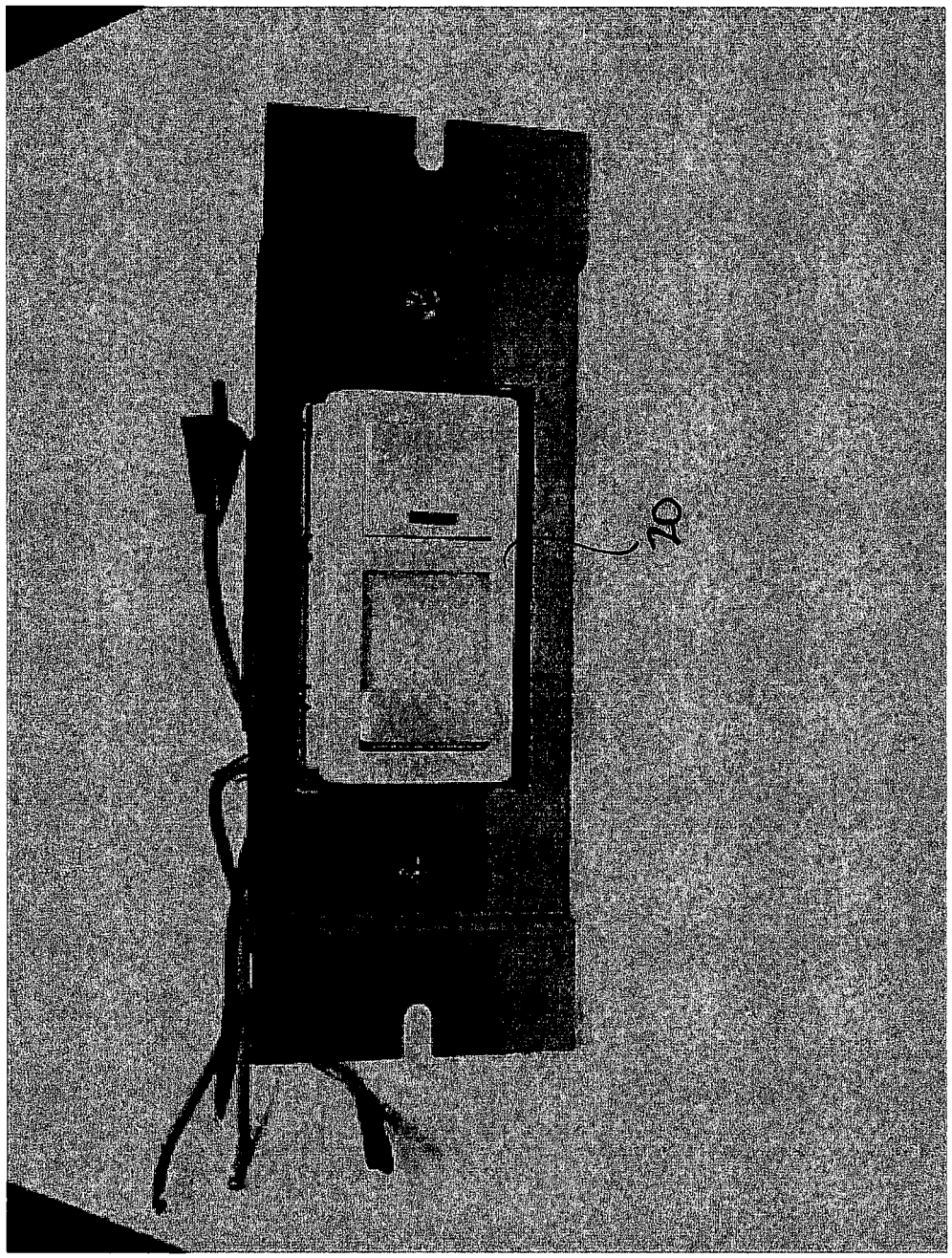
FIG. 5 is a photograph of a DC dimmer as applied to an embodiment of the inventive LED MRI-room lighting system. The unit shown is a Leviton IllumaTech™ IP710 control.

Dimming capability is controlled through compatible 0-10V dimmer 20 shown in FIG. 5, which is available through third party manufactures. It is preferable that a dimming range of approximately 5% to 100% of the LED output be available through the dimming circuit. Dimming circuits may include Leviton® IllumaTech™ IP710 series dimmer, Grafik Eye GRX-TVI control interface or other suitable alternate sink-type 0-10V dimmers. All dimming circuitry is preferably installed outside the shielded MRI environment. In addition, each luminaire preferably includes an intermediate electromagnetic interference (EMI) and/or radio frequency interference (RFI) filter which is also located outside the shielded MRI environment.

As noted above, each luminaire is preferably EMI/RFI filtered as required for use in MRI rooms. It is also preferable that all power signal lines be run through separate EMI/RFI filters. This includes all direct current (DC) and alternating current (AC) signal lines and circuitry. All power and signal wiring is preferably completely shielded in grounded conduit to achieve the necessary shielding for the requirements for MRI room usage. It is preferred that all wiring be completely enclosed in grounded conduit. It is preferred that all gaps be closed or wrapped in copper foil tape to provide the necessary shielding and complete isolation of the circuit and circuit components. Preferably, all circuit wiring is a minimum of 18 AWG and is a minimum of class 1 wiring.

Figure 8:
FIG. 8 is a photograph of an MRI-room LED lighting system installation incorporating 6-inch aperture recessed LED downlight luminaires installed in grid ceiling system.
Figure 11:
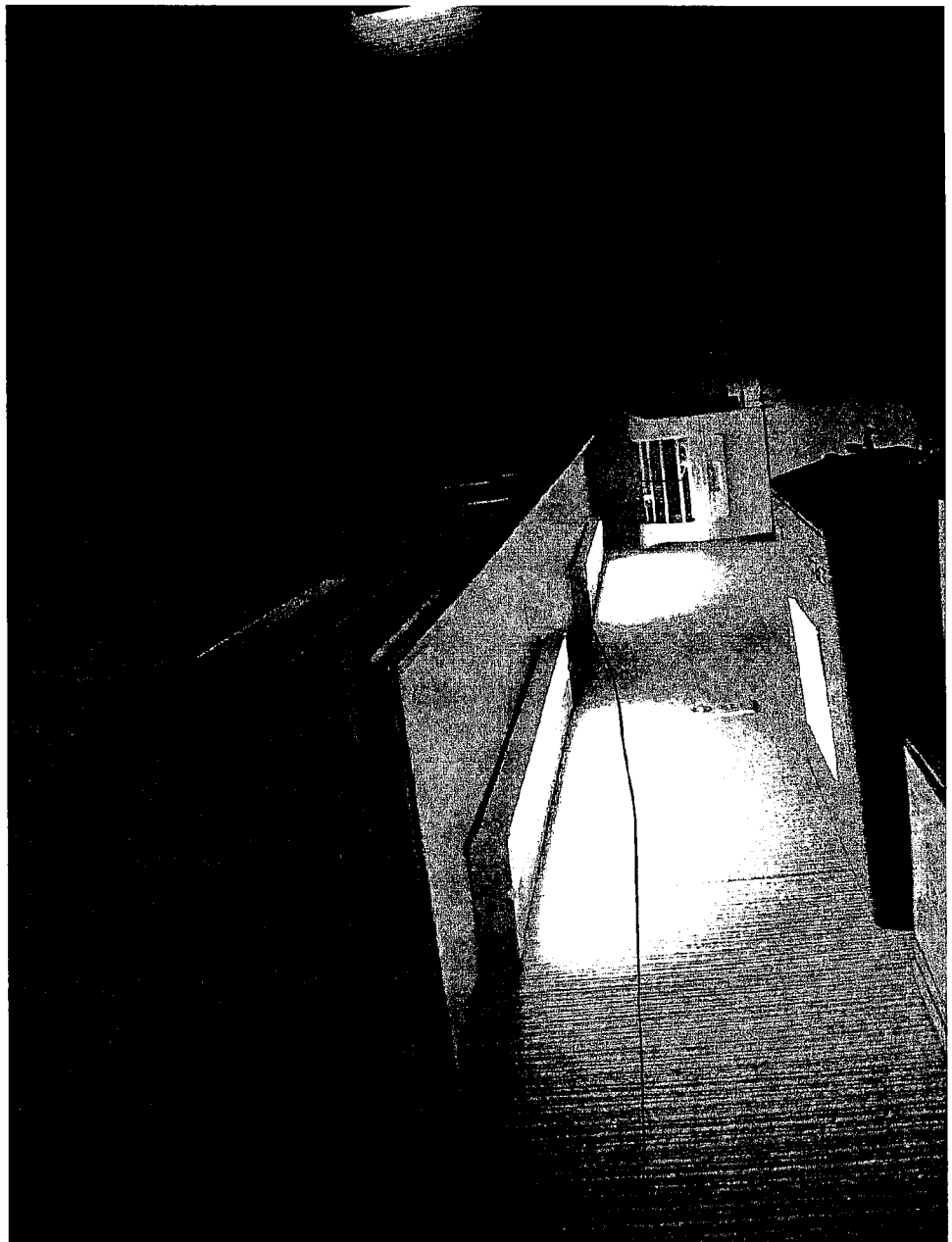
FIG. 11 is a photograph of an LED undercabinet luminaire as used in an embodiment of the inventive MRI-room LED lighting system.
Figure 12:
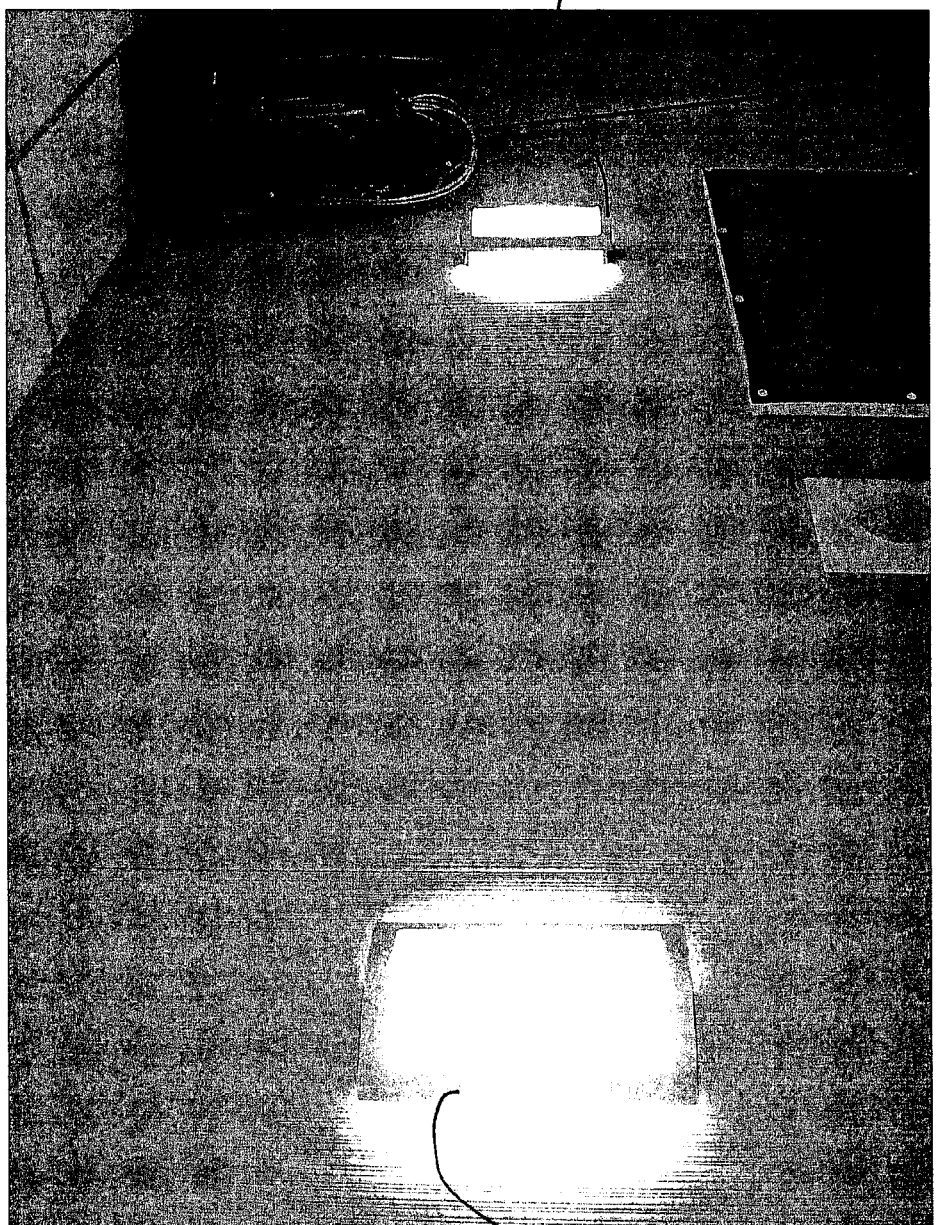
FIG. 12 is a photograph of an LED sconce luminaire as used in an embodiment of the inventive MRI-room LED lighting system.

As shown in FIGS. 2 and 8-12, the luminaires may be of various shapes, sizes, brightness and configurations. FIG. 2 shows a lighting fixture which may have a graphic image 66 into the lens system and a circular downlight, recessed can type lighting fixture 68. FIG. 8 shows a group of circular downlight, recessed can type lighting fixtures 68 in an MRI room with an MRI scanner 70. FIG. 11 shows under-cabinet lighting fixtures 72. FIG. 12 shows sconce type lighting fixtures 74. Various luminaire types can be connected in various configurations, depending on the room requirements, all being connected electrically to exhibit the same required shielding, filtering and isolation for use in MRI rooms and similar environments.

Reference throughout this specification to "the embodiment," "this embodiment," "the previous embodiment," "one embodiment," "an embodiment," "a preferred embodiment" "another preferred embodiment" or similar language means that a particular feature, structure, or characteristic described in connection with the embodiment is included in at least one embodiment of the present invention. Thus, appearances of the phrases "in the embodiment," "in this embodiment," "in the previous embodiment," "in one embodiment," "in an embodiment," "in a preferred embodiment," "in another preferred embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

While the present invention has been described in connection with certain exemplary or specific embodiments, it is to be understood that the invention is not limited to the disclosed embodiments, but, on the contrary, is intended to cover various modifications, alternatives, modifications and equivalent arrangements as will be apparent to those skilled in the art.

Any such changes, modifications, alternatives, modifications, equivalents and the like may be made without departing from the spirit and scope of the invention.

The invention claimed is:

1. In an MRI-room LED lighting system having a plurality of LED lighting fixtures and a power supply located outside of the MRI room, the improvement comprising: driver circuitry and pulse width modulation dimmer circuitry in each of the LED lighting fixtures and a dimmer control located outside of the MRI room for controlling the light output of the LED lighting fixtures, the dimmer control having a variable DC output to control the pulse width modulation dimmer circuitry in each LED lighting fixture, whereby conductor lines from the power supply and dimmer control do not require electrical shielding to avoid interference between a MRI scanner and the lighting system.

2. The MRI-room LED lighting system of claim 1 wherein the conductor lines from the power supply are electrically shielded to further reduce radio frequency interference on the lines.

3. The MRI-room LED lighting system of claim 1 wherein the conductor lines from the dimmer control are electrically shielded to further reduce frequency interference on the lines.

4. The MRI-room LED lighting system of claim 3 wherein the conductor lines from the power supply are electrically shielded to further reduce frequency interference on the lines.

5. The MRI-room LED lighting system of claim 1 wherein the LED lighting fixtures each have substantially the same driver and pulse width modulation dimmer circuitry such that the electrical-to-light characteristics of each LED lighting fixture are substantially the same.

6. The MRI-room LED lighting system of claim 1 wherein the driver and pulse width modulation dimmer circuitry in each LED lighting fixture are located on a single printed circuit board.

* * * * *

UNITED STATES PATENT AND TRADEMARK OFFICE
CERTIFICATE OF CORRECTION

| | | |
|---|---|---|
| PATENT NO. | : 8,575,841 B2 | Page 1 of 1 |
| APPLICATION NO. | : 13/106457 | |
| DATED | : November 5, 2013 | |
| INVENTOR(S) | : Cartwright | |

It is certified that error appears in the above-identified patent and that said Letters Patent is hereby corrected as shown below:

In the Specifications

In column 1, line 62, after the word "object" insert -- of --.

In column 1, line 65, delete the first occurrence of "is" and insert -- of --.

In column 2, line 26, delete "maybe" and insert -- may be --.

In column 3, line 13, after the word "embodiment" insert -- of --.

In column 5, line 49, delete "maybe" insert -- may be --.

In column 5, line 50, delete "use" insert -- used --.

Signed and Sealed this
Fifteenth Day of April, 2014

Michelle K. Lee
*Deputy Director of the United States Patent and Trademark Office*